United States Patent [19]

Kelly

[11] 3,868,748

[45] Mar. 4, 1975

[54] TENDON GRIPPING AND RELEASE ASSEMBLY

[76] Inventor: William F. Kelly, 100 Bellaire Dr., New Orleans, La. 70124

[22] Filed: June 27, 1973

[21] Appl. No.: 374,128

[52] U.S. Cl................ 24/115 M, 403/369, 403/20, 339/255 L, 254/104
[51] Int. Cl. ........................................... F16g 11/04
[58] Field of Search ....... 24/115 R, 136 R, 263 SW, 24/263 CA, 263 KH; 403/369, 371, 367, 16, 19, 20; 254/104; 339/273 S; 269/58, 28, 1 SG, 1 E, 38

[56] References Cited
UNITED STATES PATENTS

| 179,936 | 7/1876 | Bowen | 403/369 |
| 1,177,869 | 4/1916 | Kelley | 403/369 |
| 1,192,065 | 7/1916 | Jackson | 24/136 R |
| 1,919,751 | 7/1933 | Schenk | 254/104 |
| 2,166,457 | 7/1939 | Berndt | 403/371 |
| 2,325,491 | 7/1943 | Elliott | 403/16 |
| 2,505,215 | 4/1950 | Siegerist | 403/16 |
| 3,524,227 | 8/1970 | Kelly | 24/115 R |
| 3,558,147 | 1/1971 | Johansson | 403/16 |

FOREIGN PATENTS OR APPLICATIONS

| 652,546 | 4/1951 | Great Britain | 24/115 R |

Primary Examiner—Bernard A. Gelak
Attorney, Agent, or Firm—Shlesinger, Arkwright, Garvey & Dinsmore

[57] ABSTRACT

A tendon gripping and release assembly including a tapeered casing housing, spring-pressed wedge segments arranged to form a bore therebetween for the reception and retention of a steel tendon inserted into the casing, the wedge segments being urged towards the smaller end of the tapered casing by the spring. An elongated release member extends transversely through the smaller end of the tapered casing and engages one end of the wedge segments. A portion of the release member is wider than the remaining portion so that as the release member is moved through the casing, it urges the wedge segments rearwardly against the tension of the spring to release the grip on the tendon and permit removal thereof from the assembly.

13 Claims, 9 Drawing Figures

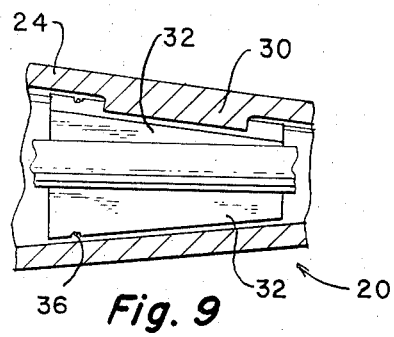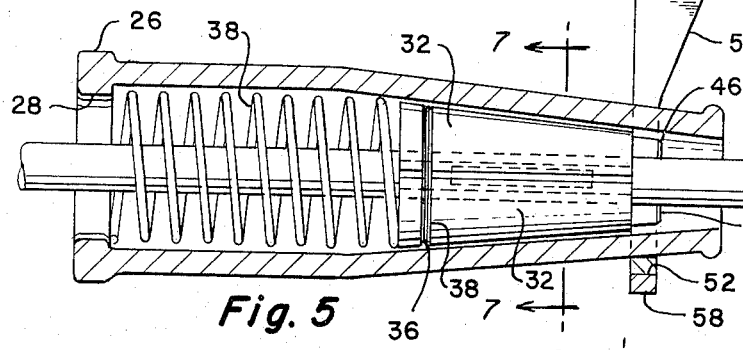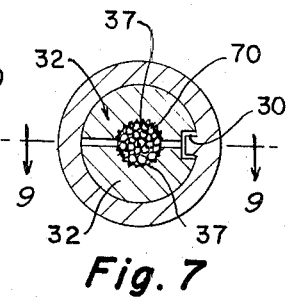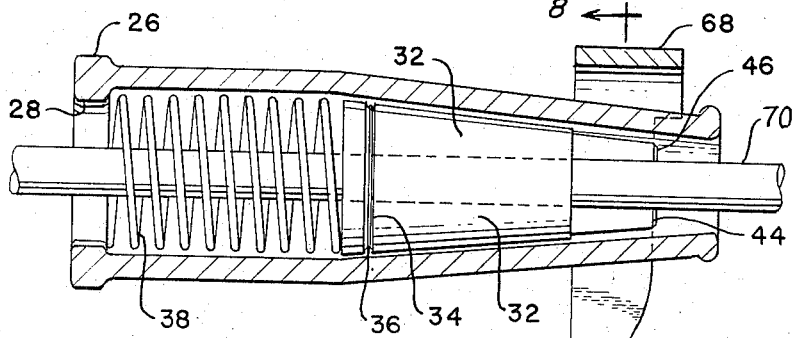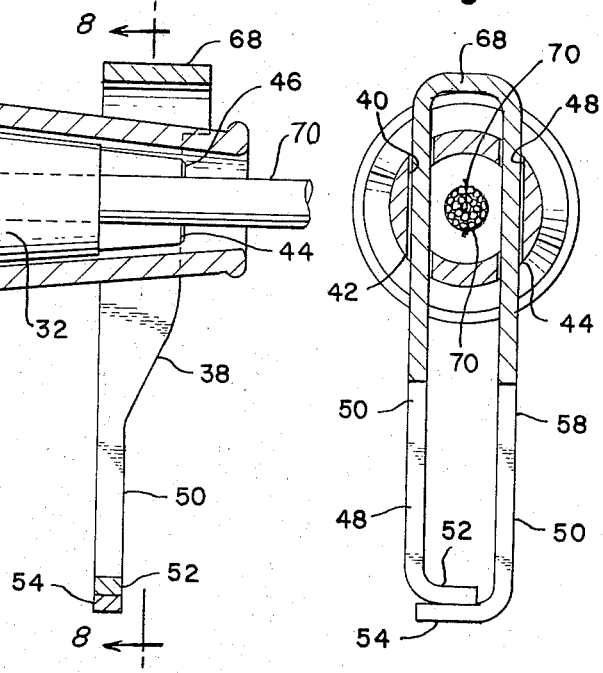

3,868,748

TENDON GRIPPING AND RELEASE ASSEMBLY

BACKGROUND AND OBJECTS

This invention is an improvement of my previously granted U.S. Pat. No. 3,524,227 granted Aug. 18, 1970 wherein a gripping and release assembly was provided wherein wedge segments within a tapered casing are urged towards the smaller end thereof by a spring. The wedge segments are provided with tendon-gripping teeth for retaining the tendon within the casing under urging of the spring. A release tool for permitting removal of the tendon from the gripping assembly embodies an articulate arm adapted for engagement with the casing. A portion of the tool extends through the casing for urging the wedge segments in a direction to compress the spring and thereby release the tendon.

Although the arrangement set out in U.S. Pat. No. 3,524,237 is very effective in actual use, in view of the fact that the release tool is a separate entity from the gripping member, it is necessary that workers carry a release tool with them or have one readily available for use as needed. This creates a problem since the release tools are at times not readily available when needed, are lost in the field, etc.

It is therefore an object of this invention to provide a tendon gripping and release assembly wherein the release member is an integral part of the assembly and therefore always available to release the grip on the tendon, or to permit gripping engagement thereof by the wedge segments when desired.

Another object is to provide a tendon gripping and release assembly of the character described which is of economical construction and comprising a few readily assembled parts, the parts being operable to rapidly grip and release a tendon inserted therein.

A still further object is to provide a tendon gripping and release assembly wherein the release member extends transversely through a casing forming a part of the gripping member, thereby effecting movement of wedge segments within the casing in a direction to compress the spring and release the grip on the tendon for removal or adjustment of the tendon.

Other objects will be manifest from the following description of the presently preferred form of the invention taken in conjunction with the accompanying drawings.

DESCRIPTION OF FIGURES OF THE DRAWINGS

FIG. 5 is a longitudinal sectional view of the invention as illustrated in FIG. 1;

FIG. 6 is a longitudinal sectional view of the invention as illustrated in FIG. 2;

FIG. 7 is a sectional view taken along the line 7—7 of FIG. 5, looking in the direction of the arrows;

FIG. 8 is a sectional view taken along the line 8—8 of FIG. 6, looking in the direction of the arrows; and FIG. 9 is an enlarged fragmentary, longitudinal sectional view of a portion of the gripping member, showing the wedge segments forming a part of the invention in elevation.

Figure 1:
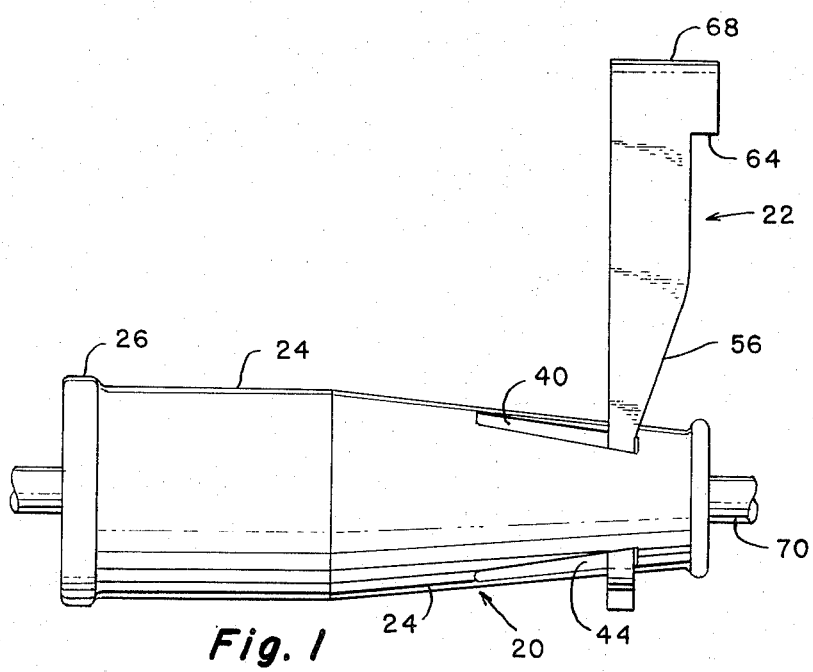
FIG. 1 is a side elevational view of the tendon gripping and release assembly of the present invention showing the release member in inoperative position.

Referring now in greater detail to the drawings, the assembly of the present invention generally comprises a gripping member 20 to which is permanently fixed a release member 22.

Gripping member 20 includes a hollow casing 24 of generally cylindrical shape, one terminal of which is provided with an outer annular flange 26 and an inner annular flange 28. From a point intermediate the flange, casing 24 is tapered gradually to the terminal thereof remote from peripheral flange 26. The tapered casing correspondingly provides a bore within the casing which is also gradually reduced from a point intermediate the length of the casing to a terminal thereof.

As shown to advantage in FIGS. 7 to 9, a portion of the inner wall of casing 24 is provided with a longitudinally extending rib 30 extending inwardly of the casing and located at a predetermined point from the terminals thereof for purposes to be hereinafter to be more fully set out.

Within the tapered end of casing 24, there is provided wedge means adapted to grippingly engage the tendon or the like which is passed through the casing. The wedge means preferably include a plurality of wedge-shaped segments 32 of the type disclosed in U.S. Pat. No. 2,138,913. The large end of each wedge segment is provided with a peripheral slot or groove 34 in order to receive a portion of a retaining ring 36 which engages the peripheral slots of the wedge slots. The opposed faces of the segments are longitudinally grooved and the grooved portions provided with teeth 37 for engaging the tendon to be passed therethrough.

The wedge segments are arranged within casing 24 in such a manner that longitudinal rib 30 is interposed between the wedge segments in order to prevent relative rotation thereof as the wedge segments move longitudinally within the casing.

A convolute spring 38 is positioned within casing 24 between the large end of wedge segments 32 and inner annular flange 28, the spring exerting a longitudinal force on the wedge members in a direction towards the smaller end of the casing.

The smaller end of casing 24 is provided with strategically positioned longitudinal slots, 40, 42, 44 and 46. Slots 40 and 42 are aligned on one side of the casing in spaced relation to aligned slots 44 and 46 on the other side of the casing.

Release member 22 is adapted for positioning in slots 40, 42, 44 and 46 and includes a generally rectangular shaped closed body. The release member body includes opposed sides in spaced relationship to each other comprising narrow flat sections 48 and 50, the end of each of which is bent inwardly and overlapped as indicated at 52 and 54. The opposite ends of flat sections 48 and 50 issue into a progressively enlarging inclined section 56 and 58 which sections in turn issue into a second flat section 60 and 62 which sections are substantially enlarged in width than section 48 and 50. Beyond sections 60 and 62, the release member body is enlarged to provide stops or abutments 64 and 66 beyond which the body is curved to provide a connecting section 68 for connecting the two parallel portion of the body. It will be noted from a consideration of the drawings that release member 22 is so arranged that the portions of the body section lie on opposite sides of a tendon 70 passing through hollow casing 24, and with the body section engaged with the terminals of the wedge members at the narrow end thereof.

OPERATION

In use of the assembly of the present invention, tendon 70 is trained through casing 24 from the small end thereof and the teeth 37 of the spring pressed wedge segments engage the outer periphery of the tendon to grip the same to prevent longitudinal movement with respect to the casing. At this time, release member 22 is in the position illustrated in FIG. 1 with flat sections 48 and 50 engaged with that portion of the casing in defining the limits of slots 40, 42, 44 and 46.

Figure 2:
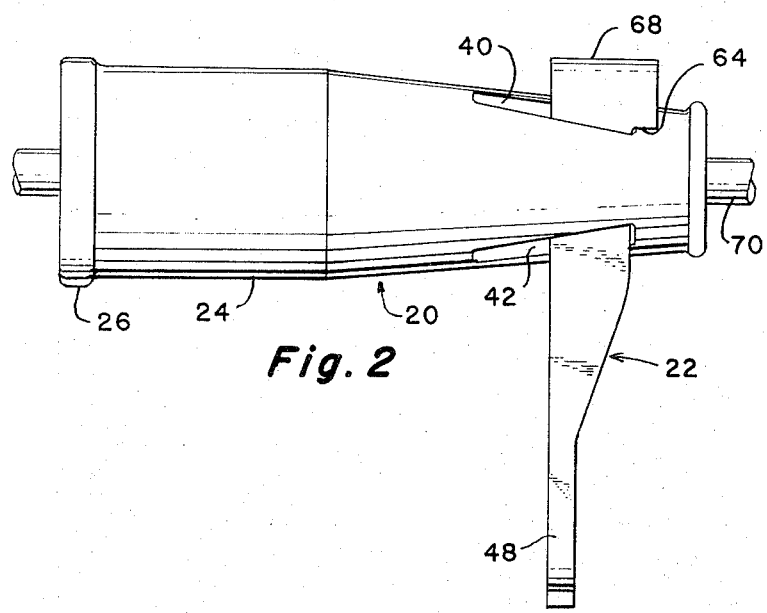
FIG. 2 is a view similar to FIG. 1 showing the release member in operative position.
Figure 4:
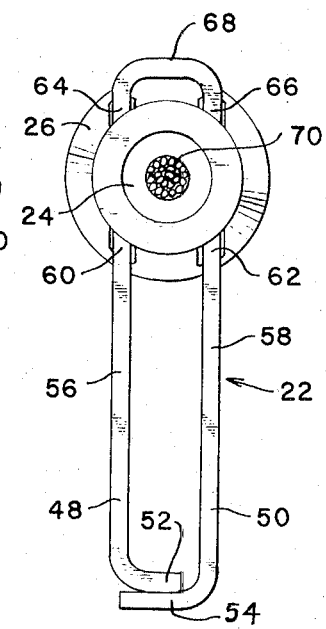
FIG. 4 is a top plan view of the same.
Figure 3:
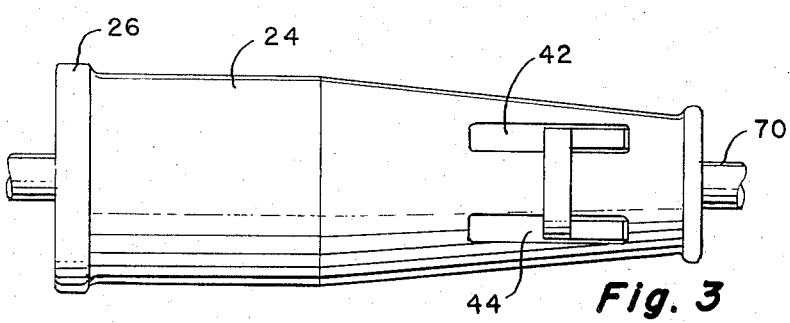
FIG. 3 is an end elevational view of the device of the present invention.

When it is desired to remove the tendon from casing 24, release member 22 is shifted transversely of casing 24 to the position shown in FIG. 2 of the drawings. When this movement occurs, the upper limits of slots 40, 42, 44 and 46 are engaged by the inclined portions 56, 58 of the release member, thereby urging the release member downwardly by virtue of the engagement of the lower limit thereof with a terminal of wedge segments 32 and forcing the segments to move in the direction of the large end of the casing against the compression of spring 38.

Continued transverse movement of release member 22 effects engagement of flat sections 60 and 62 thereof with the upper limits of the slots 40, 42, 44 and 46, and movement is continued until the casing abuts stops 64 and 66.

When the assembly of the present invention is in the position illustrated in FIG. 2, release member 22 is frictionally held in place under urging of spring 38 to prevent accidental movement thereof.

When it is desired to permit gripping engagement of the tendon by the gripping member, the procedure above described is reversed, release member 22 being shifted transversely from the position shown in FIG. 2 to the position shown in FIG. 1. This causes spring 38 to exert a longitudinal force on wedge segments 32 in a direction to move the same towards the smaller end of the casing, thereby effecting gripping engagement of the tendon by the teeth of the wedge segments.

The assembly of the present invention affords a compact, unitary means for gripping a tendon such as used in the post-tensioning or prestressed concrete, the assembly further including release means to permit ready removal or adjustment of the gripping member on the tendon. The release member is of simple, economic construction and is an integral part thereof so that accidental disengagement of the two members is not possible.

While there has been herein shown and described the presently preferred form of this invention, it is to be understood that various changes may be made therein within the scope of the appended claims.

What I claim is:

1. A gripping and release assembly for steel tendons or the like, including:
   a. a casing having a bore extending therethrough,
   b. wedge means positioned within the bore of said casing, through which the tendon passes,
   c. means on said wedge means for effecting gripping engagement with the tendon upon longitudinal movement of said wedge means in one direction within said casing,
   d. spring means within said casing for urging said wedge means into gripping engagement within the tendon,
   e. release means attached to, and movable transversely with respect to, said casing,
   f. a portion of said release means being engageable with a terminal of said wedge means, and
   g. means on said release means for selectively forcing longitudinal movement of said wedge means in a direction to release the grip on the tendon upon transverse movement of said release means in one direction and to permit gripping engagement of said wedge means with the tendon upon transverse movement of said release means in the opposite direction.

2. The gripping and release assembly of claim 1 wherein:
   a. said release means comprises an elongated body slideable transversely through said casing.

3. The gripping and release assembly of claim 1, wherein:
   a. said release means includes an elongated body,
   b. spaced, aligned longitudinal slots in said casing through which said elongated body passes,
   c. an edge of said elongated body being in contiguous engagement with an end of said wedge members,
   d. the opposite edge of said elongated body being urged to a limit of the slots of said casing,
   e. the width of said elongated body being nonuniform from one end to the other, whereby upon sliding said elongated body transversely of said casing, the wedge means are relocated longitudinally against the tension of said spring means to release the grip on the tendon.

4. The gripping and release assembly of claim 3, wherein:
   a. said casing includes pairs of aligned longitudinal slots on opposed sides of the tendon passing through the casing,
   b. said elongated body being of generally rectangular shape,
   c. said body comprising opposed, spaced sides joined by connecting end portions,
   d. said sides extending through the aligned slots on both sides of the tendon passing through the casing.

5. The gripping and release assembly of claim 4, wherein:
   a. the sides of said rectangular body comprise opposed sections of narrow width,
   b. opposed sections of enlarged width in longitudinally spaced relation to said sections of narrow width, and
   c. opposed inclined sections connecting said sections of narrow width to said enlarged sections.

6. The gripping and release assembly of claim 5, with the addition of:
   a. stop means adjacent a terminal of said elongated body for limiting transverse movement thereof through said casing.

7. A gripping and release assembly for steel tendons or the like, including:
   a. a casing having a bore extending therethrough for the reception of a tendon,
   b. said casing being tapered from a point intermediate its length to one terminal thereof,
   c. a plurality of wedge members positioned within said casing, d. the tendon being adapted to extend between said wedge members, e. each of said wedge members being provided with tendon-engaging teeth, f. spring means for urging said wedge members in the direction of the tapered end of said casing to effect gripping engagement of the teeth of said wedge members with the tendon, and g. a release member carried by, and movable transversely with respect to said casing, h. an edge portion of said release member being engageable with a terminal of said wedge members, i. said release member including means for selectively forcing longitudinal movement of said wedge members in a direction to release the grip on the tendon upon transverse movement of said release member in one direction and to permit gripping engagement of said wedge members with the tendon upon transverse movement of said release member in the opposite direction.

8. The gripping and release assembly of claim 7, wherein:

a. said release member includes an elongated body, b. longitudinal slots in said casing through which said elongated body passes, c. an edge of said elongated body being in contiguous engagement with an end of said wedge members, d. the opposite edge of said elongated body being urged by said wedge members to a limit of the slots of said casing, e. the width of said elongated body being variable from one end to the other, f. whereby, upon sliding said elongated body transversely of casing, the wedge members are relocated longitudinally of the casing by virtue of the variation in the width of said elongated body to release the tendon.

9. The gripping and release assembly of claim 8 wherein:

a. said casing includes pairs of aligned longitudinal slots on opposed sides of the tendon passing through the casing, b. said elongated body being of generally rectangular shape, c. said body comprising opposed, spaced sides joined by connecting end portions, d. said sides extending through the aligned slots on both sides of the tendon passing through the casing.

10. The gripping and release assembly of claim 9, wherein:

a. the sides of said rectangular body comprise opposed sections of narrow width, b. opposed sections of enlarged width in longitudinally spaced relation to said sections of narrow width, and c. opposed inclined sections connecting said sections of narrow width to said enlarged sections.

11. The gripping and release assembly of claim 10, with the addition of:

a. stop means adjacent a terminal of said elongated body for limiting transverse movement thereof through said casing.

12. The gripping and release assembly of claim 7, with the addition of:

a. means on said casing engageable with said wedge members for preventing rotation of the latter relative to the casing.

13. The gripping and release assembly of claim 12, wherein:

a. said means comprises a rib extending longitudinally and interiorly of said casing, b. said rib being positioned between said wedge members.

* * * * *